US007031715B1

(12) United States Patent
Love

(10) Patent No.: US 7,031,715 B1
(45) Date of Patent: Apr. 18, 2006

(54) GENERATING CELLSITE DATA TRANSMITTALS

(75) Inventor: Edward Love, Heathrow, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 438 days.

(21) Appl. No.: 10/184,183

(22) Filed: Jun. 27, 2002

(51) Int. Cl.
*H04Q 7/20* (2006.01)

(52) U.S. Cl. .................. 455/446; 455/422.1; 455/423; 455/67.11

(58) Field of Classification Search ................ 455/446, 455/422, 423, 67.11, 422.1

See application file for complete search history.

(56) References Cited

U.S. PATENT DOCUMENTS 5,434,798 A * 7/1995 Madebrink et al. ......... 709/221
6,122,513 A * 9/2000 Bassirat ...................... 455/443
6,304,756 B1 * 10/2001 Hebeler et al. ............. 455/450
6,324,411 B1 * 11/2001 Genell ........................ 455/561

* cited by examiner

*Primary Examiner*—Lester G. Kincaid
*Assistant Examiner*—Phuoc Doan
(74) *Attorney, Agent, or Firm*—Merchant & Gould

(57) ABSTRACT

A method and system are provided for setting up a new cellsite in a cellular environment by generating a data transmittal file and sending the data transmittal file to a cellsite switch. The invention includes a software application that accepts inputs and creates the data transmittal files necessary to load the data necessary to add a new cellular site to a cellular switch and thus to a cellular network. The invention also adds traffic channels to the cellular system as well. The present invention allows a service provider to write its own data transmittal files and immediately deploy new cell sites.

20 Claims, 3 Drawing Sheets

GENERATING CELLSITE DATA TRANSMITTALS

TECHNICAL FIELD

This invention generally relates to cellular communications. More particularly, the present invention relates to setting up a new cellsite in a cellular environment by generating a data transmittal file and sending the data transmittal file to a cellsite switch.

BACKGROUND OF THE INVENTION

With the increasing popularity of cellular phone communications, managing the data associated with calls to and from cellular phones has become increasingly complex. For example, one type of data that is managed is cell face transfer data. Cellular phone systems typically include a cell face (or antenna) mounted on an antenna tower receiving calls from cell phones. A cell face receives calls within an associated geographic coverage area called a cell. An antenna tower can have multiple cell faces oriented at different angles to handle calls originating from multiple directions around the antenna tower. A process is employed in order to choose a cell face that handles the call from each cell phone. The process of selecting and switching among cell faces involves the use of data that designates available cell faces. A neighbor list in the database specifies the neighboring cell faces to which the current call may be handed off to. Before handing a call to a neighboring cell face, signal strengths from all the neighboring cell faces are measured and the cell face with the strongest signal strength is designated for hand-off. For example, as a mobile call moves away from one cell face, the neighbor list is accessed to select another cell face that is closer to the call so that the call can be handed off to the closer cell face.

The neighbor list data and numerous other types of data (such as cell data, channel data, trunk group and member data, device data, etc.) is loaded in a database of a cellular network, such as one manufactured by Ericsson. Loading data into these databases may be complex.

When a new cellsite is added to a cellular network, a cellsite switch and database needs to be loaded with a data transmittal file. These files may be tedious and expensive for a service provider to produce.

SUMMARY OF THE INVENTION

In one embodiment, the invention is a software application that accepts inputs and creates the data transmittal files necessary to load the data necessary to add a new cellular site to a cellular switch and thus to a cellular network. The invention also adds traffic channels to the cellular system as well. Currently, database manufacturers such as Ericsson write data transmittal files. However, these are expensive for the service provider to buy and also may require a significant waiting time before a data transmittal file is received from the database manufacturer, thus delaying the deployment of new cell sites. The present invention allows a service provider to write its own data transmittal files and immediately deploy new cell sites.

These and other features, advantages, and aspects of the present invention may be more clearly understood and appreciated from a review of the following detailed description of the disclosed embodiments and by reference to the appended drawings and claims.

DETAILED DESCRIPTION

Figure 1:
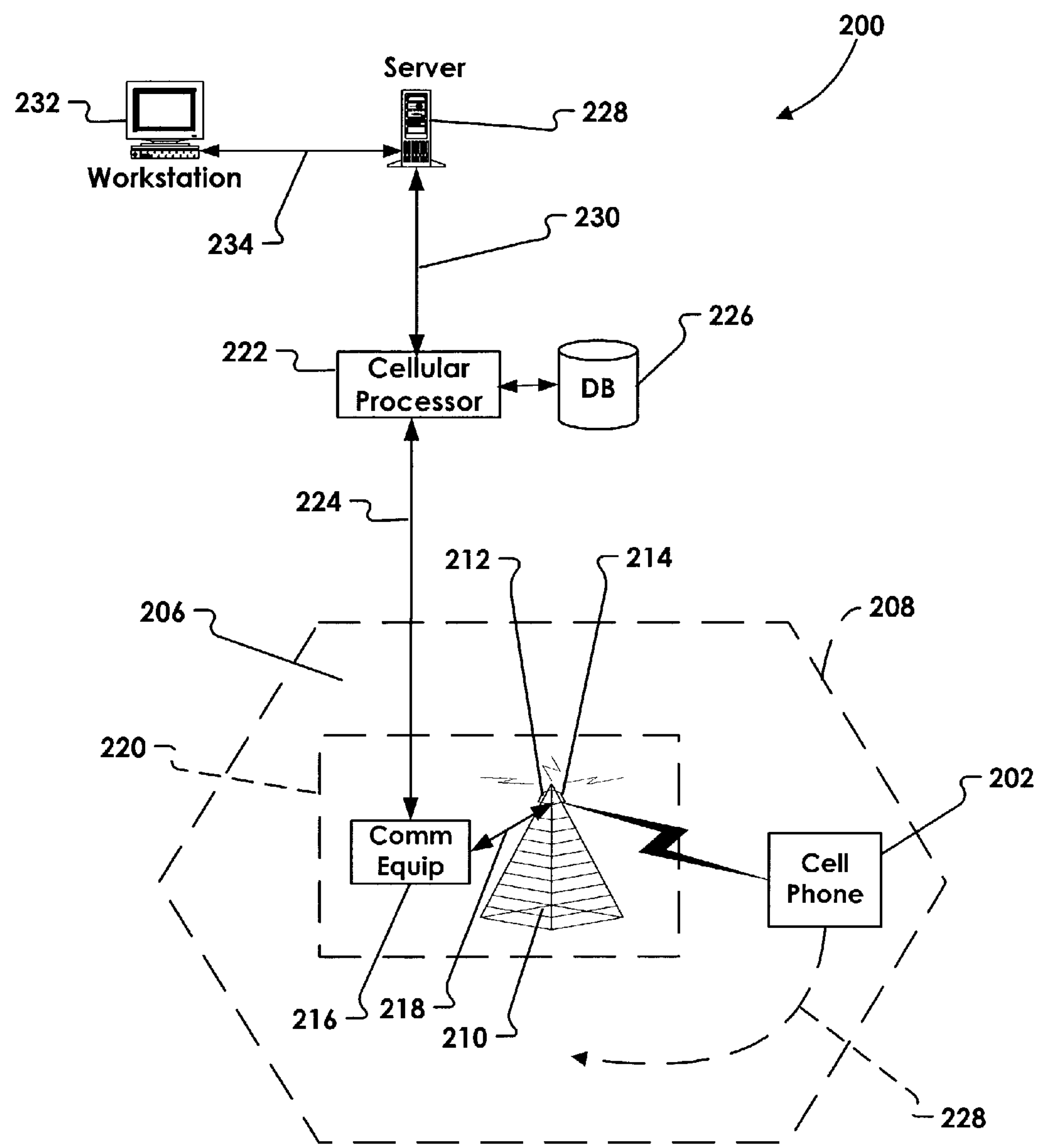
FIG. 1 is an exemplary cellular operating environment implementing an embodiment of the present invention.

In one embodiment, the present invention is a software application for receiving parameter inputs for a new cellsite. The parameter inputs are entered into a generic data transmittal file for entry into a cellular switch and/or database, such as a database or switch manufactured by Ericsson. The generic data transmittal file may be modified depending upon switch and database manufacturers' requirements.

In one embodiment, the invention is a software application that accepts inputs and creates the data transmittal files necessary to load the data necessary to add a new cellular site to a cellular switch and thus to a cellular network. The invention also adds traffic channels to the cellular system as well. Currently, database manufacturers such as Ericsson write data transmittal files. However, these are expensive for the service provider to buy and also may require a significant waiting time before a data transmittal file is received from the database manufacturer, thus delaying the deployment of new cell sites. The present invention allows a service provider to write its own data transmittal files and immediately deploy new cell sites.

Having briefly described an embodiment of the present invention, an exemplary operating environment for the present invention is described below in reference to FIG. 1. Referring now to the drawings, in which like numerals represent like elements throughout the several figures, aspects of the present invention will be described.

FIG. 1 illustrates a suitable operating environment 200 utilizing an embodiment of the present invention. The environment 200 is generally a cellular telephone system for receiving and transmitting cellular phone calls. A cellular phone 202 transmits a signal 204 within a cell 206. The cell 206 is a geographic area generally defined by a boundary 208. The cell includes an antenna tower 210 that has transmitters and receivers for transmitting and receiving signals. The transmitters on the antenna tower 210 transmit at a designated power level. Likewise, the cell phone 202 transmits the signal 204 at a designated power level. The designated power levels of the antenna tower transmitters and the cell phone 202 dictate the location of the boundary 208 of the cell 206. Receivers on the antenna tower 210 will generally receive the signal 204 while the cell phone 202 is within the boundary 208 of the cell 206. Generally, when the cell phone 202 leaves the boundary 208 of the cell 206, the receiver of the antenna 210 will no longer receive the signal 204. In one embodiment, the cell boundary 208 is substantially hexagonal in shape.

A receiver on the antenna tower 210 is generally referred to as a cell face. The antenna tower 210 may have more than one cell face, such as a cell face 212 and cell face 214. A typical antenna tower has three cell faces, but the number of cell faces can vary. Each cell face on the antenna tower 210 is positioned so that it covers an area within the cell 206. Depending on the positioning and the orientation of the cell face 214, the cell face 214 receives calls coming from a particular direction. The cell face 212 is oriented in a different position to receive calls coming from a different direction with respect to the antenna tower 210. A variety of cell face configurations are known in the art. For example, one cell face configuration is known as the omni face, which comprises a single cell face with a coverage area of 360 degrees around the antenna tower. A common cell face configuration includes three cell faces with each cell face having a coverage area of 120 degrees around the antenna tower. Typically a structure 216 is located near the antenna tower that houses communications equipment, such as radio transmitters, radio receivers, and power supplies. The communications equipment is connected to transmitters and cell faces on the antenna tower via a communications link 218. The structure 216 and the antenna tower 210 are commonly referred to as a base station 220. The base station 220 is located substantially in the middle of the cell 206.

Each cell face on the antenna tower 210 has an associated transmitter. Transmitters transmit control signals on unique control channels or frequencies that are used to send control messages to the cell phone 202. When the cell phone 202 is in operation, the cell phone 202 searches for the strongest control signal coming from the antenna tower 210. The receiver in the cell phone 202 locks on to the strongest control channel and begins receiving control information. The control information includes the transmission frequency at which the cell phone 202 should transmit. In the exemplary environment 200, when the cell phone 202 begins operation, it receives the strongest control signal from a transmitter associated with the cell face 214. Thus, as depicted in FIG. 1, the signal 204 from the cell phone 202 is received by the cell face 214. The cell phone 202 may transmit using any of a number of communications protocols known in the art. The signal 204 follows the protocol used by the cell phone 202. For example, the cell phone 202 may utilize an analog protocol known as Advanced Mobile Phone System (AMPS). Alternatively, the cell phone 202 may use a digital protocol, such as Time Division Multiple Access (TDMA).

The communications equipment 216 receives the signal 204 and may demodulate the signal. The communications equipment 216 typically is operable to receive signals in a variety of formats, including AMPS and TDMA. The signal 204 is sent to a cellular processor 222 via a communications link 224. The cellular processor 222 is typically a sophisticated computing device operable to manage cellular communications at the antenna tower 210. For example, the cellular processor 222 can monitor the signal strength of the signal 204. Also, the cellular processor 222 can detect when the cell phone 202 has been disconnected to terminate the call 204. The cellular processor 222 may also facilitate billing and locating the cell phone 202. One example of a cellular processor known in the art is the Executive Cellular Processor (ECP) manufactured by Lucent. Many other cellular processors are known in the art. The cellular processor 222 utilizes a database 226 to perform its functions. One particular function that the cellular processor 222 performs is determining which of the cell faces on the antenna tower 210 should optimally be used to receive the signal 204.

When the cell phone initially places a call 204, the cell phone 204 may be located in the coverage area of the cell face 214. Thus, the cell face 214 may have been optimal at the beginning of the conversation. However, the user of the cell phone 202 may be moving while the conversation is taking place. While the cell phone 202 moves in a direction 228, the signal strength of the signal 204 varies with respect to the cell faces 212 and 214. The cellular processor 222 detects the variation in signal strength of the signal 204. As the cell phone 202 moves in the direction 228, it moves away from the cell face 214 and closer to the cell face 212. The cellular processor 222 detects a decrease in the signal power received by the cell face 214. Eventually, as the cell phone 202 continues to move, signal power received by the cell face 214 will be less than a minimum required level. In response, the cellular processor 222 accesses the database (in particular a neighbor list) 226 to determine the cell face to which the signal 204 can be transferred.

The cellular processor 222 accesses the neighbor list in the database 226. The neighbor list is generally a list of cell faces to which a signal may be transferred or handed off. For example, the database 226 has a neighbor list associated with the cell face 214. The neighbor list for cell face 214 provides a list of available cell faces where the signal 204 can be transferred. In the example shown in FIG. 1, the cell face 212 is among the available cell faces given in the cell face transfer data for the cell face 214. After the cellular processor 222 identifies the cell face 212 as the optimal cell face, the cellular processor 222 sends a message to the communications equipment 216 indicating that the cell phone 202 should begin transmitting at a frequency associated with the cell face 212. In response to a message from the cellular processor 222, the transmitter for the cell face 214 transmits a control signal to the cell phone 202 that instructs the cell phone to switch to a frequency associated with the cell face 212. The process of transferring the cell phone signal 204 from the cell face 214 to the cell face 212 is extremely fast. There is no break in the conversation recognizable by the user of the cell phone 202. The process of transferring a signal from one cell face to another is referred to as handing off the call.

Oftentimes, updates to the database 226 are necessary. In order to update database 226, an embodiment of the present invention runs on a server 228 that is in communication with the cellular processor via a communication link 230. The server preferably includes an update system that is accessible by a workstation 232 connected to the server via a communication link 234. A user of the workstation 232 can access the update system running on the server 228 to facilitate updating of database forms. The forms may include the neighbor list. However, the forms may also include other types of cell site information data such as cell data, channel data, trunk group data, member data, device data, etc.

Figure 2:
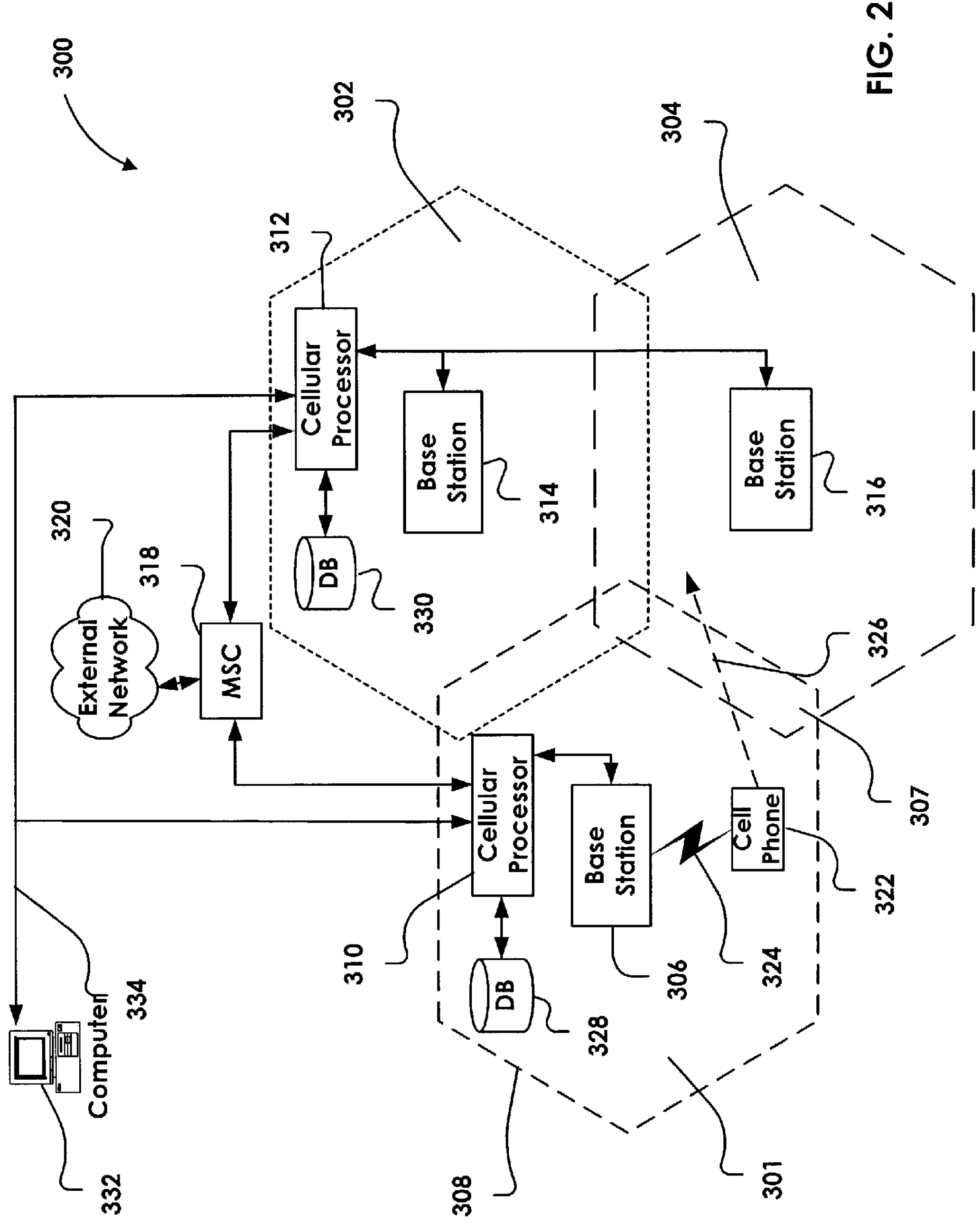
FIG. 2 is a multiple cell operating environment implementing an embodiment of the present invention.

FIG. 2 illustrates an exemplary multiple cell operating environment 300 implementing an embodiment of the present invention. The environment can include one or more cells, such as cell 301, cell 302, cell 304. Cells are often referred to as sites. Typically, each cell has an associated cell identification number used to identify the cell. Each cell has a base station, such as base station 306. The cell 302 has a base station 314 and cell 304 has a base station 316. Like the base station 220 of FIG. 1, the base stations 306, 314, and 316 each include radio equipment and an antenna tower having one or more cell faces. Cells 301, 302 and 304 may, but do not necessarily, overlap, as shown by an overlapping region 307. In one embodiment, the cell 301 has a coverage area defined by a substantially hexagonal boundary 308. During operation, a cellular processor 310 communicates with the base station 306 to monitor calls within the cell 301. Another cellular processor 312 communicates with the base station 314 and the base station 316 to monitor calls within cell 302 and cell 304 respectively. A typical cellular processor may be associated with 100 or more cells and base stations. The environment illustrated in FIG. 2 is exemplary only and the systems and methods described can generally be applied to environments including hundreds of cells.

As has been discussed, cellular processors, such as cellular processor 310 and cellular processor 312 typically monitor various data about cellular phone calls, such as signal strength, cell phone location, and billing. The cellular processors 310 and 312 also transmit signals to a mobile switching center (MSC) 318. The MSC 318 relays cell phone signals to an external network 320, such as a telephone wireline network. The MSC 318 is a sophisticated system that is in communication with networks and switches around the world to determine an optimal route for cell phone calls to reach their destination.

In the exemplary environment 300, a mobile communication device, such as a cell phone 322, is shown in the cell 301 transmitting a signal 324 to the base station 306. The signal 324 transmits voice data over a voice channel to a cell face at the base station 306. The base station 306 receives the signal 324 and transmits it to the cellular processor 310 so that the cellular processor 310 can monitor the signal 324. The cellular processor 310 may also transmit the signal 324 to the MSC 318, which may route the signal to the external network 320. The cell phone 322 may utilize any communications technology known in the art and the signal 324 may follow any protocol known in the art. Communications technologies include, but are not limited to, Code Division Multiple Access (CDMA), Advanced Mobile Phone System (AMPS), Global System for Mobile Communications (GSM), and Time Division Multiple Access (TDMA). Preferably, the base station 306 is operable to receive any or all of the possible communications technologies. The base station is configured to each technology—the radios are either analog or digital. An analog radio cannot handle digital calls. If the radio is a TDMA radio, it will not be able to handle GSM or CDMA calls.

As shown in FIG. 2, the cell phone 322 is traveling in a direction 326. The cell phone 322 is moving in the cell 301 toward the cell 304. As the cell phone 322 travels, it maintains communications with the base station 306 and the cellular processor 310 monitors the strength of the signal 324. As the cell phone 322 moves farther from the base station 306, the cellular processor 310 may detect that the strength of the signal 324 diminishes or weakens. The cell phone 307 travels through the overlapping region 307 where cell 304 and cell 301 overlap. When the signal strength of the signal 324 drops below a minimum power level, the cellular processor 310 accesses a neighbor list in a database 328 to determine an available cell face for a hand off. The database 328 contains a plurality of neighbor lists. Each neighbor list is associated with a cell face at a cell. Preferably each neighbor list has a cell identifier and a cell face identifier for the associated cell face. The cellular processor 310 reads cell face transfer data entries from the neighbor list that identify an available transfer cell face for a hand off. Handing off a call generally means transferring the call from one cell face to another cell face.

Cell face transfer data may be loaded for a new cell when a new cell such as cell 304 is implemented. For example, cell 304 and its associated base station 316 may be put into service after the cells 301 and 302 are operating. When the base station 316 is put into service, a plurality of new cell faces associated with base station 316 are made available to offer mobile communication service that was not existent prior to implementation of cell 304. As a result of the implementation of cell 304, data in the databases 328 and 330 may be updated to reflect the addition of cell 304. Data may also be loaded for new cell 304. As an example, a call in cell 301 traveling into cell 304 may be handed off to a cell face of the base station 316. The cellular processor 312 will monitor the mobile telephone user's call for various parameters including signal strength. As the traveler moves from the cell 301 toward the cell 304, the signal strength from the call may diminish. The cellular processor 312 will send a signal to the base station 306 to initiate a hand off to transfer the call to a cell face of the base station 316. The cellular processor 310 accesses the cell face transfer data stored in the database 328. The cellular processor 310 uses cell face transfer data in the database 328 to identify cell faces that are available for the call 324 to be handed off.

Also shown in FIG. 2 is a computer 332 communicating with the cellular processor 310 and 312. The computer 332 implements a loading system in accordance with an embodiment of the present invention. The loading system can automatically load the information needed in databases, such as databases 328 and 330. The communications channel 334 can be any communications means known in the art. Examples of communications channels include, but are not limited to, Ethernet, telephone lines, or any proprietary communications protocol. A user of the computer 332 can select a database and load forms and data needed in a new database.

It should be understood that a loading software application in accordance with an embodiment of the present invention may include an interactive, menu-driven interface to a cellular site information database or switch such as databases 226, 328, or 330. It should also be understood that, in a preferred embodiment, the database is a cellular site information database manufactured by Ericsson. In a preferred embodiment, a loading application program that is running on server 228 and/or computer 332 displays the interface on a monitor.

Figure 3:
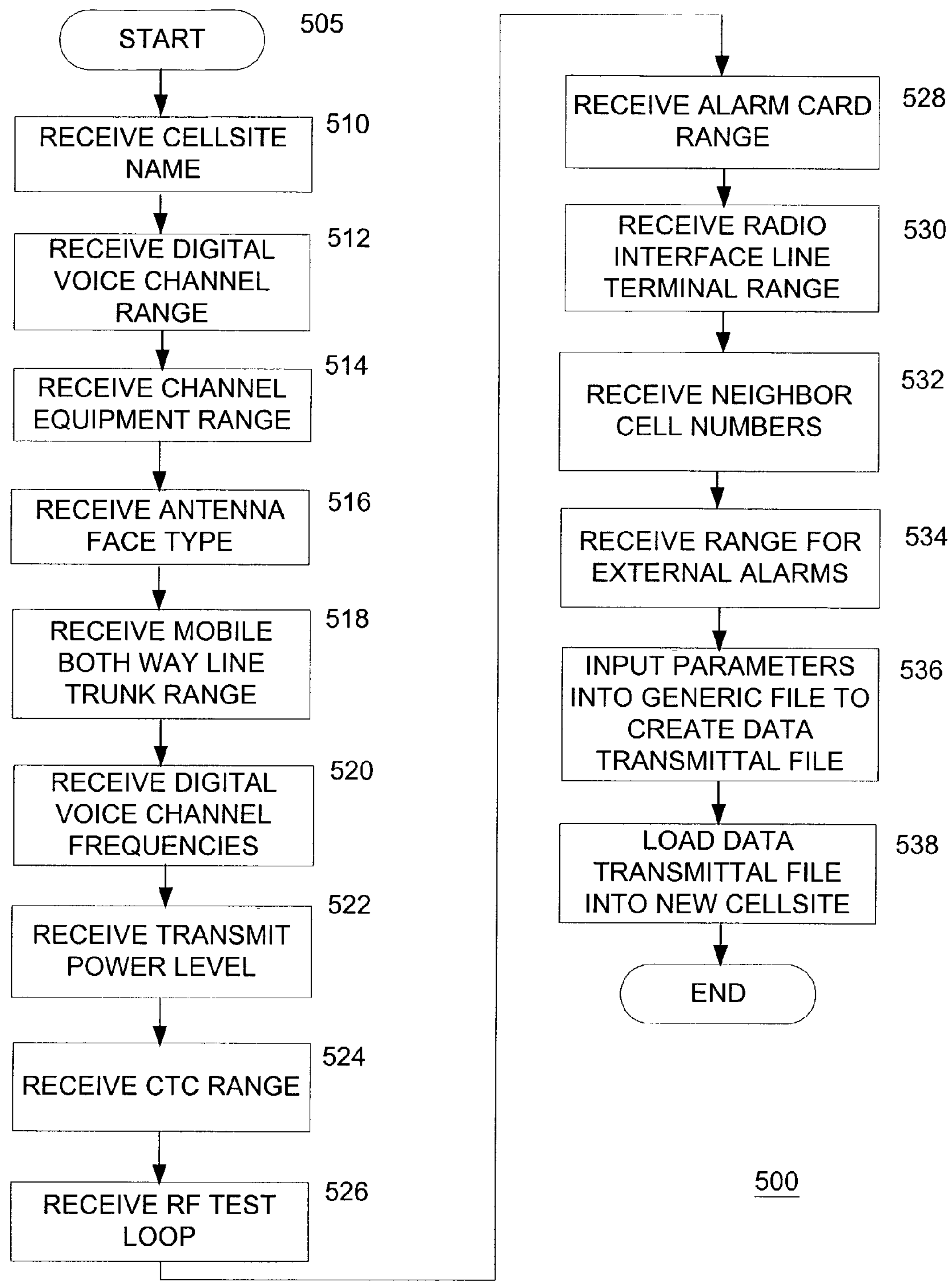
FIG. 3 is a flow diagram illustrating a method for loading a cellular database in accordance with an embodiment of the present invention.

Referring now to FIG. 3, a flow diagram illustrating a computer-implemented method for loading a cellular database in accordance with an embodiment of the present invention is described. At start step 505, the method 500 begins and proceeds to step 510 as the parameters for the new cellsite are entered. At step 510, the cellsite name is entered. Typically, the cellsite name is a character and a series of numbers, such as C001.

At step 512, the digital voice channel range is entered. For example, if channels 0–59 are used then the number range 0–59 is entered at step 512.

At step 514, the channel equipment range (CEQ) data is entered. The channel equipment is a controller(s) of the digital voice channels entered at step 512. The channel equipment range entered at step 514 may be divided by four if an Ericsson switch is being used in order to comply with Ericsson specific functionality.

At step 516. the type of faces of the antennas for the new cellsite are entered. For example, the antenna faces may be omni-directional, bisector or trisector just to name a few.

At step 518, the mobile both way line trunk range is identified indicating the T1 lines that communicate from the cellsite base station to the public switched telephone network (PSTN).

At step 520, the digital voice channel frequencies are identified. Typically, a band identifier is entered such as band "A" and the band identifier will correlate to certain frequency channels such as 1–331. In other words a band correlates to frequencies fl to fx. A lookup table may be used by the software application to accomplish the correlation between the band identifier and the corresponding frequencies.

At step 522, the transmit power level is entered. The transmit power level is the power level for the radio(s) of the new cellsite.

At step 524, the combiner tuner controller (CTC) range is entered.

At step 526, a radiofrequency (Rf) test loop is entered.

At step 528, an alarm card range is entered.

At step 530, a radio interface line terminal range is entered.

At step 532, the neighbor cells (such as the neighbor cell number) for the new cellsite are entered.

At step 534, the actual range for external alarms is entered. For example, if "32" is entered, then the software application will define the range as 0–31 and define standard alarms according to a lookup table. For example, alarm 0 may be open door alarm, etc.

At step 536, the parameters input at steps 505–536 are input into a generic file with the proper line commands to add the new cellsite with the entered parameters to create a data transmittal that may be sent and accepted by the cellsite. Typically, the generic file contains the formatting, line commands, and ordering expected by the cellsite switch. The parameters input at steps 505–536 are added in the proper places within the generic file. Of course, the software application of the present invention may also be used to preview a data transmittal before it is sent to the new cellsite.

At step 538, the generic file with the loaded parameters is loaded into the new cellsite.

It should be understood from the foregoing description that the present invention is user-friendly and easy to use. The present invention is faster than the current method of loading cellular databases.

Although the present invention has been described above as implemented in a preferred embodiment, it will be understood that alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for creating a data transmittal file for adding a cellsite to a cellular environment, the method comprising:

receiving a plurality of input parameters for the cellsite;

adding the input parameters including a cellsite name, a digital voice channel range, a channel equipment range, an antenna face type for the cellsite, a mobile both way line trunk range, digital voice channel frequencies, a transmit power level, a combiner tuner controller (CTC) range, a radio frequency (RF) test loop (RFTL) range, a radio interface line terminal range, and entering a neighbor cell for the cellsite to a generic data transmittal file to create the data transmittal file;

wherein the digital voice channel frequencies include a communications band identifier correlating to a plurality of frequency channels;

parsing a look-up table or correlating the communications band identifier with corresponding channel frequencies; and storing the data transmittal file.

2. The method of claim 1 further comprising:

receiving the data transmittal file and the plurality of input parameters at equipment associated with the cellsite; and loading the data transmittal file and the plurality of input parameters into the equipment associated with the cellsite.

3. The method of claim 1 wherein adding the input parameters to a generic data transmittal file, further comprises:

entering an alarm card range; and entering a actual range for external alarms.

4. The method of claim 1, wherein the cellsite name includes an alpha-numeric identification for the cellsite.

5. The method of claim 1, wherein the digital voice channel range includes a range of numbered digital voice channels associated with the cellsite.

6. The method of claim 1, wherein the channel equipment range includes data associated with one or more digital voice channel controllers associated with the digital voice channel range.

7. The method of claim 1, wherein an antenna face type for the cellsite includes an omni-directional antenna.

8. The method of claim 1, wherein an antenna face type for the cellsite includes a bisector antenna face.

9. The method of claim 1, wherein an antenna face type for the cellsite includes a trisector type antenna face.

10. The method of claim 1, wherein the mobile both way line trunk range includes T1 lines for communicating from a cellsite base station associated with the cellsite to a public switched telephone network.

11. The method of claim 1, wherein the transmit power level includes a transmit power level for one or more radios associated with the cellsite.

12. The method of claim 1, wherein the neighbor cells for the cellsite includes an identification for cells neighboring the cellsite.

13. The method of claim 1, wherein adding the input parameters to a generic data transmittal file to create the data transmittal file includes adding the input parameters to a generic data transmittal file wherein the generic data transmittal file includes formatting, line commands, and input parameters ordering required for acceptance by the equipment associated with the cellsite.

14. The method of claim 1 further comprising sending the data transmittal file and the input parameters to equipment associated with the cellsite.

15. A method for creating a cellsite data transmittal file in a cellular communications system, comprising:

selecting a cellsite for receiving data associated with preparing the cellsite for operation;

associating the cellsite with equipment in the cellular communication system;

entering a plurality of input parameters including a cellsite name, a digital voice channel range, a channel equipment range, an antenna face type for the cellsite, a mobile both way line trunk range, digital voice channel frequencies, a transmit power level, a combiner tuner controller (CTC) range, a radio frequency (RF) test loop (RFTL) range, a radio interface line terminal range, and entering a neighbor cell for the cellsite into a generic data transmittal file for creating the data transmittal file;

wherein the digital voice channel frequencies include a communications band identifier correlating to a plurality of frequency channels;

parsing a look-up table or correlating the communications band identifier with corresponding channel frequencies; and storing the data transmittal file.

16. The method of claim 15 further comprising transmitting the data transmittal file along with the plurality of input parameters to the equipment associated with the cellsite.

17. The method of claim 16 further comprising:

receiving the data transmittal file along with the plurality of input parameters at the equipment associated the cellsite; and loading the data transmittal file along with the plurality of input parameters into the equipment associated with the cellsite.

18. A computer-readable medium having a software application for creating a data transmittal file for adding a new cellsite to a cellular communication system, the software application comprising a software program module operative:

to receive a selection of a cellsite for receiving data associated with preparing the cellsite for operation;

to receive an association of the cellsite with equipment in the cellular communication system;

to receive a plurality of input parameters including a cellsite name, a digital voice channel range, a channel equipment range, an antenna face type for the cellsite, a mobile both way line trunk range, digital voice channel frequencies, a transmit power level, a combiner tuner controller (CTC) range, a radio frequency (RF) test loop (RFTL) range, a radio interface line terminal range, and entering a neighbor cell for the cellsite for entry into a generic data transmittal file for creating the data transmittal file the entered digital voice channel frequencies including a communications band identifier correlating to a plurality of channel frequencies; and to parse a look-up table or correlate the communications band identifier with corresponding frequency channels.

19. The computer-readable medium of claim 18, the software program module being further operative to format the plurality of input parameters for acceptance by the equipment associated with the cellsite.

20. The computer-readable medium of claim 19, the software program module being further operative to transmit the data transmittal file along with the plurality of input parameters to the equipment associated with the cellsite for loading the data transmittal file and the plurality of input parameters into the equipment associated with the cellsite.

* * * * *